United States Patent
Chevalier et al.

(10) Patent No.: US 8,559,491 B2
(45) Date of Patent: Oct. 15, 2013

(54) METHODS AND DEVICES FOR DETERMINING THE IMPULSE RESPONSE OF PROPAGATION CHANNELS INVOLVING EMITTERS, REFLECTORS AND SENSORS THAT ARE FIXED OR MOBILE

(75) Inventors: Pascal Chevalier, Courbevoie (FR); François Delaveau, Le Perreux sur Marne (FR); François Pipon, Paris (FR)

(73) Assignee: Thales, Neuilly-sur-Seine (FR)

( * ) Notice: Subject to any disclaimer, the term of this patent is extended or adjusted under 35 U.S.C. 154(b) by 461 days.

(21) Appl. No.: 12/672,633

(22) PCT Filed: Aug. 8, 2008

(86) PCT No.: PCT/EP2008/060472
§ 371 (c)(1),
(2), (4) Date: May 11, 2011

(87) PCT Pub. No.: WO2009/019313
PCT Pub. Date: Feb. 12, 2009

(65) Prior Publication Data
US 2011/0280293 A1    Nov. 17, 2011

(30) Foreign Application Priority Data
Aug. 8, 2007 (FR) ...................... 07 05772

(51) Int. Cl.
*H04B 17/00* (2006.01)
(52) U.S. Cl.
USPC ........... 375/224; 375/147; 375/220; 375/316; 375/340; 375/344; 342/89; 342/95; 342/96; 342/98; 342/99; 342/104; 342/118; 342/165; 342/171; 342/172; 342/357.2; 342/357.22; 342/375.78; 342/463; 701/412; 701/503; 701/507

(58) Field of Classification Search
USPC ................ 375/224, 147, 220, 316, 340, 344; 342/89, 95, 96, 98, 99, 104, 118, 165, 342/171, 172, 357.2, 357.22, 357.78, 463; 701/412, 503, 507
See application file for complete search history.

(56) References Cited

U.S. PATENT DOCUMENTS

| | | | |
|---|---|---|---|
| 2005/0285787 A1 * | 12/2005 | Delaveau et al. | ............. 342/387 |
| 2007/0058733 A1 | 3/2007 | Masse et al. | |
| 2008/0226003 A1 * | 9/2008 | Chevalier et al. | ............. 375/354 |

FOREIGN PATENT DOCUMENTS

| | | | |
|---|---|---|---|
| EP | 0 665 665 A1 | 5/1995 |
| EP | 1 500 951 A1 | 1/2005 |
| FR | 2 854 290 A1 | 10/2004 |
| FR | 2 882 479 A1 | 8/2006 |

* cited by examiner

*Primary Examiner* — Leon Flores
(74) *Attorney, Agent, or Firm* — Baker Hostetler LLP

(57) ABSTRACT

A method for measuring certain parameters of the impulse response of a propagation channel involving emitters and reflectors that are fixed or mobile, and for detecting and determining the parameters regarding the position and kinematics of the emitters and reflectors, or for auto-locating the reception system implementing the invention, in a system comprising N sensors receiving signals from the emitters or from the reflection on the reflectors. The method determines an ambiguity function which couples the spatial analysis and the delay-distance/Doppler-kinematic analysis, and determines at least one sufficient statistic $C(l,m,K)$ corresponding to the correlation between the known signal $s(kTe)$ corresponding to the complex envelope of the signal emitted and the output of a filter $w(l,m)$ where l corresponds to a temporal assumption and m corresponds to a frequency assumption. The method also determines the values of the pair $(l,m)$ by comparing the value of the statistic for the pair $(l,m)$ with a threshold value.

17 Claims, 3 Drawing Sheets

METHODS AND DEVICES FOR DETERMINING THE IMPULSE RESPONSE OF PROPAGATION CHANNELS INVOLVING EMITTERS, REFLECTORS AND SENSORS THAT ARE FIXED OR MOBILE

CROSS-REFERENCE TO RELATED APPLICATIONS

This application is a National Stage of International patent application PCT/EP2008/060472, filed on Aug. 8, 2008, which claims priority to foreign French patent application No. FR 07 05772, filed on Aug. 8, 2007, the disclosures of which are hereby incorporated by reference in their entirety.

BACKGROUND OF THE INVENTION

The present invention relates to a method for making it possible to evaluate certain parameters of the impulse response of the propagation channel of electromagnetic or acoustic waves, when the latter involves emitters, sensors and reflectors that are fixed or mobile, by means of a combined space/delay-distance/Doppler-kinematic ambiguities function, for the detection and the determination of the position and kinematic parameters of the emitters and of the reflectors.

It is used in many areas of electromagnetism and acoustics, in detection, transmission, location, navigation, in order to improve the knowledge of the propagation medium, consequently improve the processing of the useful signals, the engineering of the radiocommunication and broadcast radio networks, air traffic control, coastal control, etc.

It can be applied to the self-locating of a reception system implementing the invention.

It is used, for example, for emitters, reflectors and sensors that are fixed or mobile in electromagnetism and in acoustics.

The propagation, sounding, detection and location measurement systems of conventional electromagnetic or acoustic reflectors are more often than not active and generally use:
  a mechanical sweep with a directional antenna (dish reflector for example) or an electronic sweep with a beam formed from an array of phase- and amplitude-weighted sensors, and
  for each aiming position (or spatial cell) of the beam:
    the emission of known signals that can be continuous, pulsed or in the form of known pulse trains,
    calculation of a distance/speed ambiguities function based, in the case of narrow band signals, on the correlation, with the emitted signals, of the signals observed at the antenna output and offset in time and frequency, and based in the case of wide band signals, on the correlation, with the emitted signals, of the signals observed at the antenna output that are delayed, offset in frequency, compressed in time and in frequency,
  for each distance/Doppler cell
    a threshold setting for a given false alarm probability,
    a comparison of the ambiguities function with the threshold.

The main particular feature of this operation is the decoupling between the spatial analysis (the sweep of a beam) and the distance/speed or delay/Doppler analysis. This decoupling creates the need to systematically implement a distance/speed analysis for each beam position, whether or not there are emitters or reflectors in the beam.

Moreover, the aiming of a beam implicitly presupposes a propagation in free space (without multiple paths) and requires, for the electronic sweep, a control of the antenna pattern (model of the radiating elements and of the network, calibration of the sensor array, etc).

Also, for a given space/distance/Doppler cell, the adjustment of the threshold requires a prior estimation of the noise level based on the observation of the space/distance/Doppler cells without reflectors, which can prove difficult to implement and costly in computation terms. Furthermore, in the presence of interference, techniques for ejecting interference by spatial filtering have to be inserted in reception for each position of the swept beam, which thus becomes antijamming and robust against interference. However, since the swept beam has a certain angular width, inversely proportional to the aperture of the antenna or of the network (in terms of number of wavelengths), the rejection of the interferences for a given spatial cell can be accompanied by the rejection of the reflecting echoes present in this same cell. For this reason, techniques to increase robustness preventing the rejection of the reflectors to be measured must be incorporated in processing operations at the cost of a potential loss of performance on the rejection of the interferences and increased complexity in implementation.

The problem with measuring propagation or with electromagnetic or acoustic detection involves detecting the presence of the emitted signal $s(kT_e)$ over a certain duration $0 \leq k \leq K-1$, and estimating the channel vector $h_s$ (relating to a multiple-sensor reception and corresponding to the directing vector of the position of the reflector or of the emitter for propagation in free space), the delay $l_o T_e$ (assumed for simplicity to be a multiple of the sampling period, but this is by no means mandatory or limiting) and the Doppler shift $\Delta f_o = m_o / KT_e$ (the frequency resolution being $1/KT_e$, it is assumed for simplicity that the Doppler shift is a multiple of this resolution), from the knowledge of the emitted signal and from the observation of frequency-shifted and -translated versions of the vectors $x(kT_e)$ of the signals received on the sensor.

In the case of a conventional propagation measurement or detection application in electromagnetism or in acoustics, the conventional receivers presuppose a propagation in free space, that is to say $h_s \triangleq e^{j\phi_s} s$ and scan the space, direction by direction or vector s by vector s, with a resolution corresponding to the lobe width (generally the lobe width "at 3 dB") of the beam formed by the network used, where $h_s$ is the vector of the impulse responses of the channels associated with the direction of the reflector, and $\phi_s$ and s respectively correspond to the phase and the directing vector of the emitter or of the reflector. This defines the abovementioned concept of spatial cell, commonly used by those skilled in the art. Moreover, the delay $l_o T_e$ is estimated with a resolution equal to $1/B_e$, which is nominally a function (generally proportional to) of the inverse of the equivalent band, $B_e$, of the emitted signal, which inverse also defines the distance resolution. This defines the concept of distance cell mentioned above and commonly used by those skilled in the art. Finally, the resolution of the estimation of the Doppler shift is a function (generally proportional) of the inverse of the individual observation time, that is to say of the inverse of the duration $KT_e$ of the emitted signal. This defines the concept of Doppler cell mentioned above and commonly used by those skilled in the art.

The prior art defines different reception structures. Generally, the reception structure of an optimal detector depends on the information available a priori on the propagation channels of the signals emanating from the emitters and reflectors to be detected and on the overall noise, which comprises the thermal noise of the receivers and the potential interferences [1]. The conventional receivers used in electromagnetic [2] or acoustic [4] detection, which scan the space by electronic or mechanical sweeping of a beam and implement a spatial analysis upstream and decoupled from the distance/Doppler analysis, presuppose, generally, implicitly or explicitly, for each position of the beam and each distance/Doppler cell scanned:
- a propagation in free space,
- the known scanned direction,
- the overall Gaussian noise, circular and unknown,
- the signals emanating from emitters or from reflectors that are weak relative to the background noise,
- the unknown phase of the signals emanating from the emitters or from the reflectors.

These receivers are optimal only given these assumptions. The object of the invention is to replace the above conventional structures with a reception structure that makes it possible to overcome at least the abovementioned system drawbacks. It notably consists in effecting a coupling of the spatial analysis, and of the delay-distance/Doppler-kinematic analysis in a combined process. It implements a coupled/combined processing of the delay-distance space variables. The inventive method makes it possible notably to determine the parameters of the impulse response. These parameters are, for example, parameters relating to the spatial, temporal and frequency structure of the radioelectric field (arrival angle distributions, angular, temporal and Doppler diffusion, etc). These parameters can also be characteristics of diffusion by obstacles on the ground, in space, etc., or even kinematics parameters of the diffusers.

SUMMARY OF THE INVENTION

The invention relates to a method for detecting and/or locating emitters and reflectors that are fixed or mobile, in a system comprising N sensors receiving signals emanating from said emitters or reflectors that are fixed or mobile, characterized in that it comprises at least the following steps:
- determining an ambiguity function by coupling the spatial analysis and the delay-distance/Doppler-kinematic analysis,
- determining at least one sufficient statistic $\hat{C}(l, m, K)$ corresponding to the correlation between the known signal s(kTe) corresponding to the complex envelope of the signal emitted and the output of a filter w(l,m), where l symbolizes a temporal/delay-distance assumption and where m symbolizes a frequency/Doppler-kinematic assumption, determining the values of the parameters of the assumption (l, m) by comparing the value of the statistic for the parameters of the assumption (l, m) with a threshold value.

The Doppler/kinematic parameter cites m as the index of the variables. It should be noted that the above notations for the statistic $\hat{C}(l, m, K)$, for the signal s(kTe) and the filter w(l,m) are interpreted in a formal sense: as a complete generality, each of the parameters l, k and m can represent a number of variables associated with the position and the kinematics of the emitter, of the reflector, even of the sensor, if it is itself mobile. However, for a narrow band signal and a coherent integration time of the process that is sufficiently small to guarantee a variation of the position and of kinematics of the emitter, of the reflector and of the sensor that is reduced, we fall back on the simplified cases described above: the temporal assumption l is reduced to an assumption concerning a delay value, and the frequency assumption m is reduced to an assumption concerning a Doppler shift value, respectively corresponding to multiples (integer or otherwise) of the resolutions explained above. To guarantee the effectiveness of the method in the most complex cases, for example when the kinematics of the sensor, of the emitter or of the reflector induce non-stationarities of the delay or Doppler parameters during the coherent integration time of the signals in the implementation (non-stationarities associated, for example, with a fast speed), the definition of l takes into account not only the delay of the signal emanating from the reflector, but also the first order parameters such as the relative temporal ramp of the signal emanating from the reflector (or derivative of the delay over the integration time, itself dependent on the temporal envelope of the signal and on the parameterization of the processing operation that is the subject of the invention), not only the Doppler shift m of the signal emanating from the reflector, but also first order parameters such as the Doppler ramp of the signal emanating from the reflector (or derivative of the Doppler shift over the integration time, itself limited by the spectral envelope of the signal and the parameterizing of the processing operation that is the subject of the invention). In even more complex cases, it is possible to use second order relative angular, temporal and Doppler parameters, and any other type of variable modeling the kinematics of the emitter, the reflector or the sensor.

In the cases where the temporal parameters symbolized by l are reduced to a delay or to a distance, and where the kinematics parameters symbolized by m are reduced to a Doppler or to a relative speed, the method comprises at least the following steps:
for each delay assumption l and each Doppler assumption m:
- estimating the vector $\hat{r}_{x_m s}(lT_e)$ (5) from K known samples, $s(kT_e)$, from the signal emitted and from the K observations that are offset in frequencies, $x_m((k+1)T_e) = x((k+1)T_e)\exp[-j2\pi m(k+1)/K]$, $0 \le k \le K-1$
- estimating the matrix $\hat{R}_{x_m}(lT_e)$ from the K observations that are offset in frequencies, $x_m((k+1)T_e) = x((k+1)T_e)\exp[-j2\pi m(k+1)/K]$, $0 \le k \le K-1$
- calculating the sufficient statistic $$\hat{C}(l,m,k) \triangleq (1/\hat{\pi}_s)\hat{r}_{x_m s}(lT_e)^\dagger \hat{R}_{x_m}(lT_e)^{-1}\hat{r}_{x_m s}(lT_e) \text{ where } \hat{\pi}_s$$

is defined by the least squares estimate of the average power of the known signal,
- setting the detection threshold for a given false alarm probability
- comparing the statistic $\hat{C}(l, m, K)$ with the fixed threshold and ordering the detection of the emitter or of the reflector in the distance/Doppler cell (l, m) if the threshold is exceeded
- estimating the relative delay and distance of the emitter or of the reflector from l
- estimating the relative Doppler and speed of the emitter or of the reflector from m
- estimating the spatial cell of the emitter or of the reflector from the directing vector $\hat{h}_s$ on the antenna of the signal emanating from the emitter or the reflector given by $\hat{h}_s = \hat{r}_{x_m s}(lT_e)$.

In more complex cases, the method comprises, for example, the following steps:
3A) temporal parameters are introduced into the definition, such as delays-positions symbolized by l, into the definition of the frequency parameters, such as Doppler-kinematic, symbolized by m, and into that of the known signal s on each assumption l and m, the variables and the transformations of the signal induced by the movements of the emitter, the receiver or the reflector, and by the fluctuations of the propagation channel, dependent on the delay-position assumption, the relative Doppler-speed assumption, the processing integration time, the equivalent bandwidth of the signal, the equivalent duration of the signal and its periodicity when it is pulsed during the processing integration time, on the fluctuation of the delay over this time, on the fluctuation of the Doppler over this time, 3B) the signal $s_{l,m}$ obtained from the transformation of s is used according to the temporal assumptions symbolized by l and the frequency assumptions symbolized by m.

For the detection of an emitter or of a reflector whose signal is subjected to high interference, the method uses a signal $x'_m((k+1)T_e)$ and a replica s' instead of the input signal $x_m((k+1)T_e$ and the original replica s, the signal $x'_m((k+1)T_e))$ being obtain from the signal $x_m((k+1)T_e)$ and the replica s' being obtained from the original replica s or from the transformed replica $s_{l,m}$ by means of operations involving enhancing space-time filters such as the following:

6A) for each interfering emitter:
estimation of the impulse response $g_{int}$ of the propagation filter from the emitter to the receiver by minimizing the criterion $$\hat{\varepsilon}_{int}(l_0, L) \triangleq \frac{1}{L} \cdot \sum_{0}^{L-1} |x((l_0 + l)T_e) - g_{int}^\dagger S_{int}|^2,$$

the replica $S_{int}=(s_{int}((l_0+1)T_e), s_{int}((l_0+1+1)T_e), \ldots, s_{int}((l_0+1+L-1)T_e))^T$ or $S_{intm,l}"=(s_{intm,l}^{>>}((l_0+1)T_e), s_{intm,l}^{>>}((l_0+1+1)T_e), \ldots, s_{intm,l}^{>>}((l_0+1+L-1)T_e))^T$ being obtained either by total a priori knowledge of the original interfering signal, or by partial a priori knowledge of the original interfering signal, or by demodulation/equalization of the original interfering signal by any means known to those skilled in the art, and undergoing a possible transformation to $S_{intm,m,l}$ 6B) for one or more interfering emitters that are fixed or of known kinematics, and chosen according to their frequency and time stability,
different frequency assumptions are introduced onto the replica $S_{int}$ and recurrences present in the replica are exploited in order to precisely estimate, over great integration lengths K, the frequency and time deviations relative to the interfering emitter, drifts relative to the interfering emitter are estimated for the local oscillators of the mixers and of the clocks of the system for receiving and sampling the signals used to implement the invention.

During the step 6B, the method comprises, for example, the following steps: the propagation filter $g_{int}$ associated with the interfering emitter is updated (step 6A), and 6C) for each interfering emitter,
a convolution of the original $s_{int}$ or transformed $s_{intm,1}$ interfering signal is executed by the propagation filter $g_{int}$ which is associated with it, the signal resulting from this operation is subtracted from the total received signal, 6D) the frequency and time drifts are compensated
either on the signal resulting from $x_m((k+1)T_e)$ after the preceding operations, in order to produce the signal $x'_m((k+1)T_e)$, s then remaining unchanged (s'=s)
or on the replica signal used in the method, s may thus become s', $s_{m,l}$ may become $s_{m,l}'$ 6E) implementation of the abovementioned steps at $x'_m$ and s'

6F) implementation of the abovementioned steps at $x'_m$ and $s_{m,l}'$.

An observation vector $\tilde{x}_m((k+1)T_e) \triangleq [x_m((k+1)T_e)^T, x_m((k+1)T_e)^\dagger]^T$, is used, for example, consisting of the observation vector and its conjugate complex and in that the abovementioned steps are implemented from $\tilde{x}_m((k+1)T_e)$ instead of $x_m(k+1)T_e)$.

There is also available, for example, a total noise only reference and the abovementioned steps are executed by using an estimate of the extended total noise only matrix, $\hat{R}_{\tilde{b}_{Tm}}(lT_e)$, obtained via noise only reference samples, in place of an estimate of the extended observations correlation matrix, $\hat{R}_{\tilde{x}_m}(lT_e)$, in which $\tilde{b}_m((k+1)T_e) \triangleq [b_m((k+1)T_e)^T, b_m((k+1)T_e)^\dagger]^T$.

Since the directing vector of the reflector is known for rectilinear emitted signals and potentially non-circular interferences, the method is characterized in that it comprises at least the following steps:
calculating the sufficient statistic $$\hat{C}_{nc}(l,m,K) \triangleq (1/\hat{\pi}_s)\hat{r}_{\tilde{x}_ms}(lT_e)^\dagger \hat{R}_{\tilde{x}_m}(lT_e)^{-1}\hat{r}_{\tilde{x}_ms}(lT_e)$$

constructing a matrix $$M \triangleq \begin{pmatrix} s & 0 \\ 0 & s^* \end{pmatrix} \quad (21)$$

constructing a statistic $$\hat{F}_{nc}(l, m, s, K) = (1/\hat{\pi}_s) \quad (20)$$

$$\frac{\hat{r}_{\tilde{x}_ms}(lT_e)^\dagger \hat{R}_{\tilde{x}_m}(lT_e)^{-1} M [M^\dagger \hat{R}_{\tilde{x}_m}(lT_e)^{-1} M]^{-1}}{1 - \hat{C}_{nc}(l, m, K)}$$

$$M^\dagger \hat{R}_{\tilde{x}_m}(lT_e)^{-1} \hat{r}_{\tilde{x}_ms}(lT_e)$$

setting the detection threshold for a given false alarm probability,
comparing the value of the statistic $\hat{F}_{nc}$(l, m, s, K) with the threshold and detecting the emitter or the reflector in the distance/Doppler cell (l, m) and the spatial cell s if the threshold is exceeded,
estimating the relative delay and distance of the emitter or of the reflector from l,
estimating the relative Doppler and speed/kinematics of the emitter or of the reflector from m,
estimating the angular position of the emitter or of the reflector from s. The invention also relates to a device comprising a means, such as a processor, suitable for executing the steps of the inventive method.

The space/delay-distance/Doppler-kinematic coupling that is the subject of the invention makes it possible notably to directly access the positions of the emitters and the reflectors without having to sweep all the space and therefore without having to scan the directions that have no emitters and reflectors. It makes it possible to relax the constraints on control of the pattern of the network of sensors (for example, in the case of coupling between radiating elements, the calibration is no longer necessary) and is perfectly suited to propagation with multiple paths. Finally, this judicious coupling allows not only for a threshold setting that is independent of the noise level present at the input but also for an intrinsic protection with regard to interferences without risking rejecting the signals that are useful to the measurement and without having to insert processing operations to increase robustness.

BRIEF DESCRIPTION OF THE DRAWINGS

Other benefits and features of the invention will become more apparent from reading the following description of a simplified exemplary embodiment, given by way of illustration and by no means limiting, with appended figures that represent.

DETAILED DESCRIPTION

Figure 1:
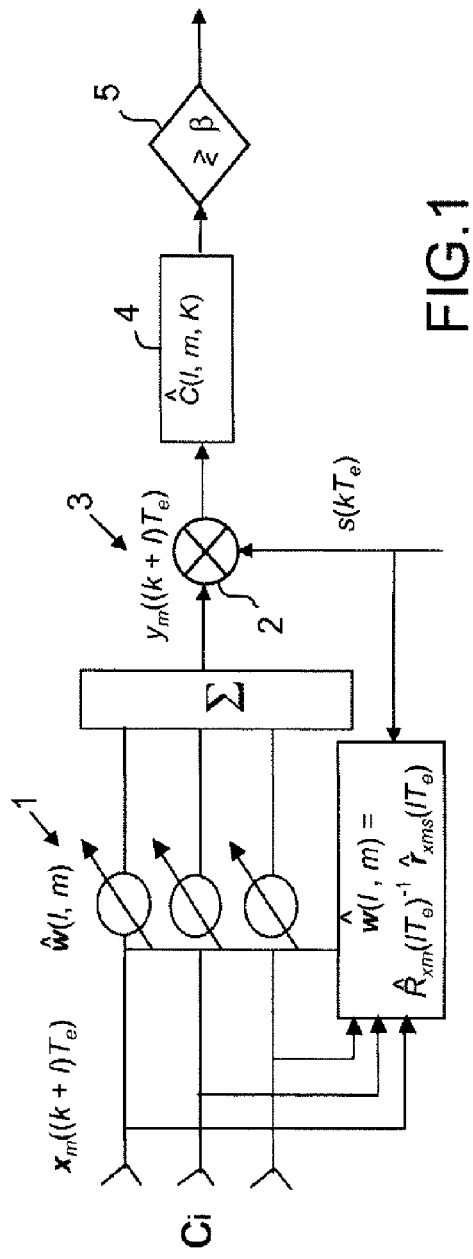
FIG. 1, a functional diagram of the space/delay-distance/Doppler-kinematic ambiguities function according to the invention, the Doppler-kinematics parameters being reduced in this nonlimiting simplified case to the Doppler parameter directly linked to the relative speed of the emitter or the reflector.

An antenna is considered that has N narrow band (NB) digital sensors Ci receiving the contribution from an emitter or a reflector of a continuous, pulsed or repeated pulsed signal originating from an electromagnetic or acoustic emission system of known opportunity (nonlimiting examples: a communications emitter that is previously demodulated, or of which certain portions of the signal are a priori known—synchronization words and codes—the emitting part of a channel sounder, etc.), to which is added a total noise consisting of interferences and background noise. Given these assumptions, the vector $x(kT_e)$ of the complex envelopes of the signals sampled and observed at the output of the sensors Ci is assumed to be given by:

$$x(kT_e) \approx s((k-l_o)T_e)\exp[j2\pi m_o(k-l_o)/K]h_s + s_T(kT_e) \quad (1)$$

where $T_e$ is the sampling period of the digital sensor, s(t) is the complex envelope of the emitted signal, known for the receiver and of duration $KT_e$, $b_T(kT_e)$ is the sampled total noise vector, not correlated with the signal emanating from the reflector, $h_s$ is the vector of the impulse responses of the channels associated with the signal emanating from the reflector, $l_o T_e$ is the propagation delay of the signal emanating from the reflector containing in particular the information concerning the distance between the reflector, the emission system being used and the sensor, a delay that is assumed to be equal to a multiple of $T_e$ for simplicity, an assumption given as a nonlimiting example, $\Delta f_o = m_o/KT_e$ is the Doppler shift induced by the reflector (potentially mobile), assumed to be equal to a multiple of the inverse of the integration time of the processing operation $KT_e$ for simplicity, an assumption given as a nonlimiting example, which contains the information on the relative speed of the reflector relative to the positions of the emission system and the sensor that are used. Strictly speaking, the model (1) presupposes propagation channels with no temporal spread, which occurs, for example, for a propagation in free space (satellite telecommunications, airborne radiocommunications, etc.) or channels with signal fading for which the coherence band of the channel is greater than the bandwidth of the signal, better known by the term "flat fading", which affects certain radiocommunication or detection situations in urban areas. In particular, for a propagation in free space, $h_s \triangleq e^{j\phi_s} s$, where $\phi_s$ and s respectively correspond to the phase and the directing vector of the signal emanating from the emitter or the reflector. The model (1) also presupposes that the temporal and frequency parameters of the emitter or the reflector are reduced to a delay and to a Doppler shift, this description being strictly complete only for emitters or reflectors of particular kinematics (uniform rectilinear motion and limited speed relative to the coherent integration time of the process).

However, the method is also applied to temporally spread channels. In these conditions, the useful portion of (1) corresponds in fact to the contribution of a path or propagation mode of the signal emanating from the emitter or the reflector, the other paths being integrated in the total noise vector.

Furthermore, as stressed previously, the method also applies to the emitters, reflectors or sensors exhibiting a kinematic that is more complex than a rectilinear motion that is uniform and of limited speed in relation to the integration time of the process. In these conditions, the useful portion of (1) corresponds in fact to the contribution of a signal that undergoes the deformation induced by this kinematic, and an observation of the useful signal must be considered that is complemented with first order parameters (order 1) as stated previously, for example a temporal ramp and a Doppler ramp, to report on high relative speeds or movements with limited acceleration of the emitter, the reflector or the sensor during the coherent integration phase of the process that is the subject of the invention, even second order parameters (order 2) to report on significant acceleration/deceleration phases of the emitter, the reflector or the sensor during the coherent integration of the process that is the subject of the invention; and finally modeling the deformations of the signal s induced by the temporal assumption symbolized by 1 and induced by the frequency assumption symbolized by m before applying the method to the signal $s_{l,m}$ obtained in this way by transformation of s. Note the abovementioned list of parameters is not limiting, other parameters can be introduced to model the impact of the kinematic of the emission system, the sensor or the reflector on the signal emanating from the latter.

Second Order Observation Statistics

The second order statistics considered hereinafter in the description correspond to the first correlation matrix of the vector of the complex envelopes of the signals sampled and observed at the output of the sensors, $x(kT_e)$, defined, given the preceding assumptions, by $$R_x(kT_e) \triangleq E[x(kT_e)x(kT_e)^\dagger] \approx \pi_s((k-l_o)T_e)h_s h_s^\dagger + R(kT_e) \quad (2)$$

which depends on the time in general because of the potential non-stationarity of the emitted signal (digital modulations for the communications signals for example . . . ). In the above expressions, $\dagger$ represents a conjugate transpose, $R(kTe) \triangleq E[b_T(kT_e) b_T(kT_e)^\dagger]$ is the first correlation matrix of the vector $b_T(kT_e)$, $\pi_s(kT_e) \triangleq E[|s(kT_e)|^2]$ is the instantaneous power of the signal emanating from the emitter or the reflector that would be received by an omnidirectional sensor for a propagation in free space.

The various embodiments described hereinbelow are implemented, for example, in a receiver comprising several reception antennas $C_1, \ldots, C_N$ and a processor P programmed to execute various steps. The various exemplary embodiments are given in relation to FIGS. 1, 2, 3 and 4.

The inventive method relies notably on the determination of an ambiguity function by using a coupling of the spatial analysis and of the delay-distance/Doppler-kinematic analysis in a combined process.

Exemplary Embodiments of the Invention

A first variant embodiment of the inventive method, illustrated in FIG. 1, consists in finding the temporal/delay-distance assumption $l=\hat{l}_o$ and the frequency/Doppler-kinematic assumption $m=\hat{m}_o$ such that the known samples $s(kT_e)$, $0 \le k \le K-1$, are optimally detected from observation vectors $x_m((k+l)T_e)=x((k+l)T_e) \exp[-j2\pi m(k+l)/K]$, $0 \le k \le K-1$, assuming $R(k)$ and $h_s$ to be unknown and making no assumption concerning the propagation channels and the level of the signal emanating from the emitter or the reflector.

One method consists in finding $l=\hat{l}_o$ and $m=\hat{m}_o$ such that the known samples $s(kT_e)$, $0 \le k \le K-1$, are optimally estimated, in the least squares sense, from a linear filtering operation on the observations $x_m((k+l)T_e)$, $0 \le k \le K-1$. In other words, the method seeks to find $l=\hat{l}_o$ and $m=\hat{m}_o$ minimizing the least squares criterion $$\hat{\epsilon}(l, m, K) \triangleq \frac{1}{K}\sum_{k=0}^{K-1} |s(kT_e) - \hat{w}(l,m)^\dagger x_m((k+l)T_e)|^2 \qquad (3)$$

where $\hat{w}(l, m)$, referenced 1 in FIG. 1, is the spatial filter that minimizes the criterion (3) and that is defined by $$\hat{w}(l,m) \triangleq \hat{R}_{x_m}(lT_e)^{-1}\hat{r}_{x_m s}(lT_e) \qquad (4)$$

where the vector $\hat{r}_{x_m s}(lT_e)$ and the matrix $\hat{R}_{x_m}(lT_e)$ are given by $$\hat{r}_{x_m s}(lT_e) \triangleq \frac{1}{K}\sum_{k=0}^{K-1} x_m((k+l)T_e)s(kT_e)^* \qquad (5)$$

$$\hat{R}_{x_m}(lT_e) \triangleq \frac{1}{K}\sum_{k=0}^{K-1} x_m((k+l)T_e)x_m((k+l)T_e)^\dagger \qquad (6)$$

Introducing (4), (5) and (6) into (3), a new expression of the least squares criterions $\hat{\epsilon}(l, m, K)$ is given by:

$$\hat{\epsilon}(l,m,K) = \hat{\pi}_s[1 - \hat{C}(l,m,K)] \qquad (7)$$

where $\hat{C}(l, m, K)$, referenced 4 in FIG. 1, such that $0 \le \hat{C}(l, m, K) \le 1$, is given by:

$$\hat{C}(l,m,K) \triangleq (1/\hat{\pi}_s)\hat{r}_{x_m s}(lT_e)^\dagger \hat{R}_{x_m}(lT_e)^{-1}\hat{r}_{x_m s}(lT_e) \qquad (8)$$

and $\hat{\pi}_s$ is defined by:

$$\hat{\pi}_s = \left[\frac{1}{K}\sum_{k=0}^{K-1} |s(kT_e)|^2\right] \qquad (9)$$

It is deduced from (7) that $\hat{l}_o$ and $\hat{m}_o$ are respectively the parameters l and m that maximize the sufficient statistic $\hat{C}(l, m, K)$ given by (8).

In practice, a value $\beta$, 5 in FIG. 1, is set for the detection threshold so that the probability that the statistic (8) exceeds this threshold in the absence of a signal emanating from the emitter or the reflector is equal to a certain value called false alarm probability (FAP). Consequently, an emitter or a reflector is detected for the distance cell l and the Doppler cell m if the statistic (8) exceeds the threshold $\beta$ for the pair (l, m).

This receiver requires no assumption concerning the propagation channels, the interferences or the emitted signal, since the latter is partially or totally known (on completion of a prior demodulation for example). This receiver requires no sweep of the space. Furthermore, it is independent of the power of the observation vector, which means that the detection threshold is independent of the noise level present at the input inasmuch as, when K is greater than a few units or tens of units, the law of probability of the statistic $\hat{C}(l, m, K)$ approximately follows a Gaussian law and is no longer affected by the law of the interferences regardless of their levels.

Conditions of Optimality in Terms of Similarity Ratio

Figure 3:
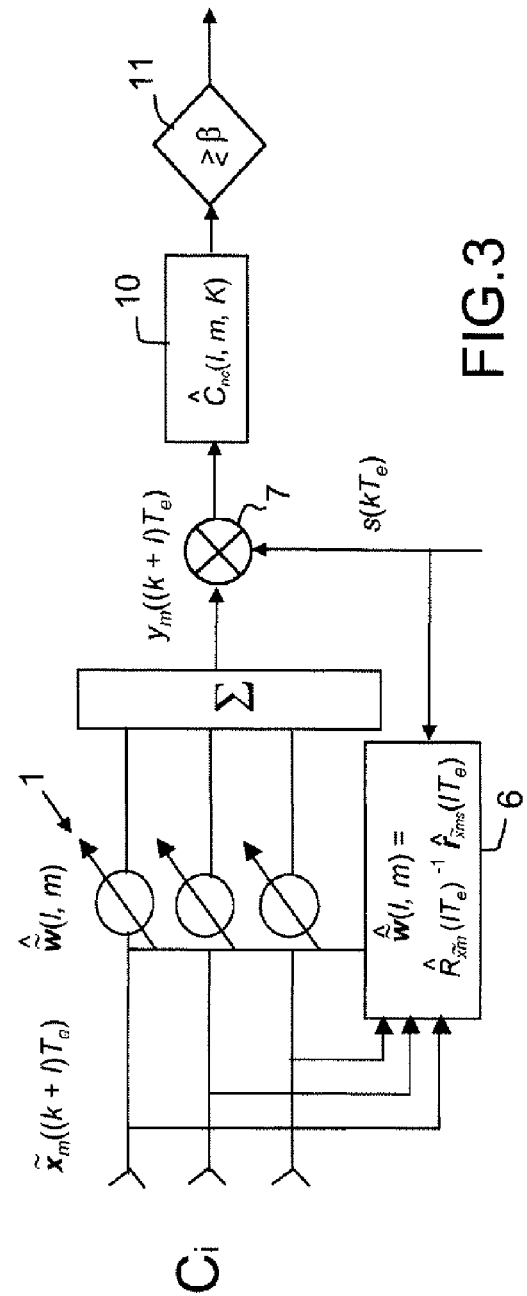

Starting with the optimum detection instant $l_o T_e$ and the optimum Doppler shift $\Delta f_o = m_o/KT_e$, and assuming the situation with two assumptions H0: presence of total noise only in $x_{mo}((k+l_o)T_e)$, and H1: presence of total noise and of the useful signal in $x_{mo}((k+l_o)T_e)$, which can be expressed as follows:

$$H1: x_{mo}((k+l_o)T_e) \approx s(kT_e)h_s + b_{Tmo}((k+l_o)T_e) \qquad (10a)$$

$$H0: x_{mo}((k+l_o)T_e) \approx b_{Tmo}((k+l_o)T_e) \qquad (10b)$$

in which $b_{Tmo}((k+l_o)T_e) = b_T(k+l_o)T_e)\exp[-j2\pi m_o(k+l_o)/K]$, in this context, according to the statistical theory of the detection (after Neyman Pearson) [1], the optimum strategy for detection of the signal emanating from the emitter or the reflector $s(kT_e)$ based on the observations $x_{mo}((k+l_o)T_e)$ over the duration of the emitted signal, consists in comparing the similarity ratio (RV), $L(x)(l_o, m_o)$, with a threshold, the similarity ratio being defined by $$L(x)(l_o, m_o) \triangleq \frac{p[x_{mo}((k+l_o)T_e), 0 \le k \le K-1, /H1]}{p[x_{mo}((k+l_o)T_e), 0 \le k \le K-1, /H0]} \qquad (11)$$

in which $p[x_{mo}((k+l_o)T_e), 0 \le k \le K-1/Hi]$ (i=0, 1) is the conditional probability density of the vector $[x_{mo}(l_o T_e)^T, x_{mo}((1+l_o)T_e)^T, \ldots, x_{mo}((K+l_o-1)T_e)^T]^T$ given the assumption Hi. It is then possible to show that the receiver characterized by (8) is a sufficient statistic for the issue of optimum detection of the signal emanating from the emitter or the reflector in the generalized similarity ratio sense if the following conditions are met:

A1: the samples $b_{Tmo}((k+l_o)T_e)$, $0 \le k \le K-1$ are not correlated with one another,
A2: the matrix $R((k+l_o)T_e)$ does not depend on k,
A3: the matrix $R((k+l_o)T_e)$ is unknown,
A4: the vector $h_s$ is unknown,
A5: the vectors $b_{Tmo}((k+l_o)T_e)$, $0 \le k \le K-1$ are Gaussian,
A6: the vectors $b_{Tmo}((k+l_o)T_e)$, $0 \le k \le K-1$ are circular to the second order, The statistic (8) can also be written in the form, referenced 4:

$$\hat{C}(l, m, K) = (1/K\hat{\pi}_s)\sum_{k=0}^{K-1} y_m((k+l)T_e)s(kT_e)^* \qquad (12)$$

in which $y_m((k+l)T_e) \triangleq \hat{w}(l, m)^\dagger x_m((k+l)T_e)$ is the output of the filter $\hat{w}(l, m)$ for the observation vector $x_m((k+l)T_e)$. Thus, it is deduced from (12) that the sufficient statistic $\hat{C}(l, m, K)$, 4, corresponds, to within a normalization factor, to the result of the correlation 3 between the known signal $s(kT_e)$ and the output, $y_m((k+l)T_e)$, of the filter $\hat{w}(l, m)$ as is illustrated in FIG. 3.

The filter $\hat{w}(l, m)$ is the estimate, in the least squares sense, over K observation vectors, of the filter $w(l, m) \triangleq R_x^{-1} r_{x_m s}(lT_e)$, obtained when $K \to \infty$, which minimizes the temporal average, over an infinite observation horizon, of the mean quadratic error between $s(kT_e)$ and the output $w^\dagger x_m((k+l)T_e)$, in which $R_x \triangleq <E[x_m((k+l)T_e)x_m((k+l)T_e)^\dagger]>$, $r_{x_m s}(lT_e) \triangleq <E[x_m((k+l)T_e)s(kT_e)^*]>$ and in which $<\cdot>$ is the temporal averaging operation, in k, over an infinite observation horizon. As long as l and m remain distant respectively from $l_o$ and $m_o$, the filter w(l, m) remains close to zero, which generates statistical values $\hat{C}(l, m, K)$ that are also close to zero, to within the estimation noise due to the finite duration of the emitted signal. When l and m respectively approach $l_o$ and $m_o$, $$C(l, m, K) \triangleq K \xrightarrow{lim} \infty \hat{C}(l, m, K)$$

increases and reaches its maximum for $l=l_o$ and $m=m_o$. In this case, the useful portion of the observation vector $x_{mo}((k+l_o)T_e)$ and the emitted signal $s(kT_e)$ are in phase, the filter $w(l_o, m_o)$ corresponds, assuming a statistical independence between the total noise and the emitted signal, to the following space adapted filter (SAF):

$$w(l_o,m_o) \triangleq R_x^{-1} r_{x_{mo^s}}(l_o T_e) = [\pi_s/(1+\pi_s h_s^\dagger R^{-1} h_s)] R^{-1} h_s \quad (13)$$

i.e. to the space filter that maximizes the signal to interference plus noise ratio (SINR) at the output, in which $\pi_s = <E[|s(kT_e)|^2]>$ and $R = <E[b_T(kT_e)b_T(kT_e)^\dagger]>$. Consequently, $C(l_o, m_o, K)$ is written:

$$C(l_o, m_o, K) = \frac{r_{x_{mo^s}}(l_o T_e)^\dagger R_x^{-1} r_{x_{mo^s}}(l_o T_e)}{\pi_s} \quad (14)$$

$$= \frac{SINR_y}{1 + SINR_y}$$

$$= w(l_o, m_o)^\dagger h_s$$

in which $SINR_y$ is the SINR at the output of the SAF, $w(l_o, m_o)$, defined by:

$$SINR_y = \pi_s h_s^\dagger R^{-1} h_s \quad (15)$$

The function $C(l_o, m_o, K)$ is an increasing function of $SINR_y$ approaching unity for high signal to interference plus noise ratio values at the output $SINR_y$. As long as the number of interferences remains less than the number of sensors, the SAF (13) rejects the interferences while maximizing the signal to noise ratio (SNR) at the output. In these conditions, the correlation operation between the emitted signal and the output of an estimate of the SAF generates a maximum correlation from a limited number of samples K whose minimum value should consequently increase when the SINR at the output decreases.

Thus, for each scanned distance/Doppler cell, the calculation of the associated SAF makes it possible to maximize the SINR at the output of the intercepted path whereas, for a conventional receiver, the space filter is constant for all the distance/Doppler cells of one and the same spatial cell.

Comments

The temporal assumption or the distance cell offering a detection gives information on the relative delay/distance from the emitter to the receiver (and on the absolute delay/distance if synchronization information is available on the emitter) or on the distance of the reflector relative to the emitter and to the receiver.

The frequency assumption or the Doppler cell offering a detection gives information on the relative speed of the emitter in relation to the receiver or on the speed of the reflector relative to the positions and kinematics of the emitter and the receiver.

The spatial cell associated with a detection is defined by $\hat{h}_s = \hat{R}_{x_{mo}}(l_o T_e)\hat{w} = \hat{r}_{x_{m^s}}(lT_e)$, it is possible to envisage the detection and simultaneous characterization of all the emitters and reflectors present without a priori concerning their position and with no spatial sweep.

The proposed processing operation is not exclusive to the use of fixed or revolving directional antennas, whether at the level of the emission system being operated or at the level of the sensor and of the method that is the subject of the invention, which allow for a sector by sector search and offer an additional antenna gain against the noise (improving sensitivity) and a supplementary space filtering of the interferences.

The proposed processing can be envisaged even if the emission system emits different signals simultaneously, even in the same frequency band ("colored" emissions for example).

Space-Time Extensions of the Method to Improve Performance in the Presence of Interference and Multiple Propagation Paths, and in the Presence of Reception System Faults.

When there are large numbers of interferences, for example when the signal to be processed emanates from a reflector in the presence of signals originating from multiple emitters or emitters associated with multiple propagation paths or when the reception systems used exhibit certain instability or desensitization faults, it is possible to increase the number of degrees of freedom in the method and consequently improve its separation capacity, its capacity to discriminate low speed emitters and reflectors, and its sensitivity. The steps described hereinabove use a temporal prefiltering of the total signal received consisting, for each interfering emitter, in evaluating the overall contribution of the interfering emitter—resulting from the convolution of the signal emitted by the interfering source by the propagation filter that is associated with it, this signal and this filter being previously estimated—then in subtracting from the incoming signal the overall contribution resulting from the interfering emitter. A simplified exemplary embodiment is given hereinbelow, by way of illustration and in a nonlimiting manner, appended to FIG. 2 which represents an implementation of the general method described previously, associated with the space-time prefiltering that is the subject of the present extension.

Strong interferences correspond, for example, to interferences with a value 10 to 40 dB greater than the receiver to be detected.

Figure 2:
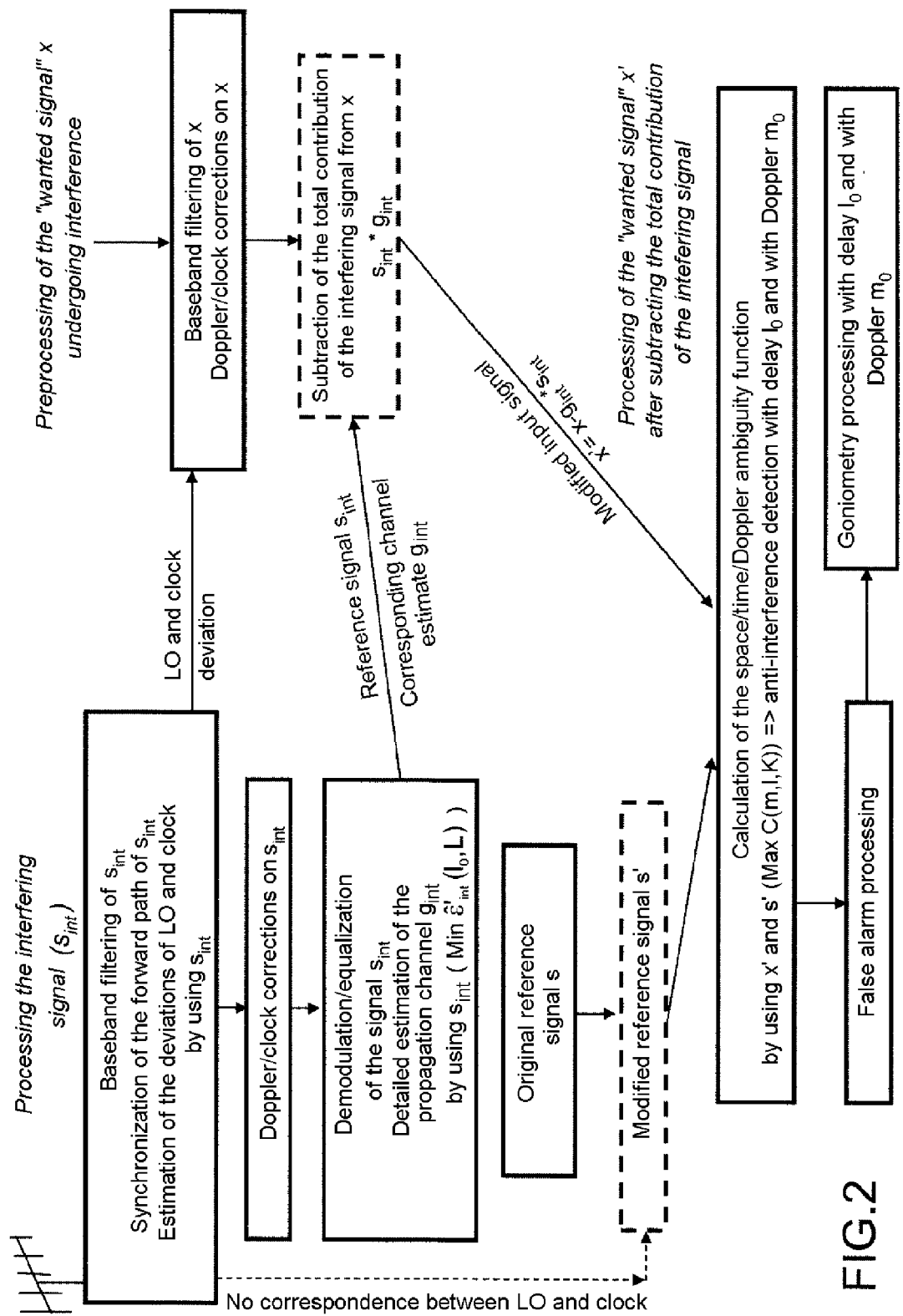
FIG. 2, an exemplary implementation of the method taking into account the interferences, FIG. 3, a functional diagram of the non-circular extension of the space/delay-distance/Doppler-kinematic ambiguities function, the Doppler-kinematics parameters being reduced in this nonlimiting simplified case to the Doppler parameter directly linked to the relative speed of the emitter or the reflector, and FIG. 4, a functional diagram of the space/delay-distance/Doppler-kinematic ambiguities function when s is known, the Doppler/kinematics parameters being reduced in this nonlimiting simplified case to the Doppler parameter directly linked to the relative speed of the emitter or the reflector.

To prefilter the signal, it is essential to estimate the signal $s_{int}(kT_e)$ emitted by the interfering source and the signal propagation channel $g_{int}(lT_e)$ which is associated with it. FIG. 2 describes different construction possibilities for $s_{int}$.

For this, different methods can be implemented depending on the case:
  when the originally emitted interfering signal $s_{int}$ is totally known when the interfering source is, for example (in a nonlimiting way), a channel sounder, a previously demodulated radiocommunication or radio broadcasting emitter, a radar or an active sonar:
  the method evaluates the filter, induced by the propagation of the signal from the interfering emitter to the receiver by any estimation method known to those skilled in the art, for example (in a nonlimiting way) by searching for the coefficients $g_{int0}=g_{int}(l_0 T_e)$, $g_{int1}=g_{int}((l_0+1)\cdot T_e)$, ..., $g_{intL}=g_{int}((l_0+L)\cdot T_e)$ of the propagation filter $g_{int}=(g_{int1}, g_{int2}, ..., g_{intL})$ that minimize, at the instant $l_0$, the temporal least squares criterion $\hat{\epsilon}int'(l_0, L)$ hereinbelow, evaluated according to the signal x taken on an appropriately chosen antenna, and according to the replica $S_{int} = (s_{int}((l_o+1)T_e), s_{int}((l_0+1+1)T_e), \ldots, s_{int}((l_0+1+L-1)T_e))^T$ taken over L temporal samples.

$$\hat{\epsilon}'_{int}(l_0, L) \triangleq \frac{1}{L} \cdot \sum_{0}^{L-1} |x((l_0+l)T_e) - g^\dagger_{int} S_{int}|^2 \quad (16)$$

The impulse response $g_{int}$ of the duly restored filter contains all the propagation paths from the emitter to the receiver.

When the originally emitted interfering signal $s_{int}$ is partially known, when the interfering source is, for example, a communication emitter that is standardized or the subject of known technical specifications: the equalizing filter for the received interfering signal is estimated by methods known to those skilled in the art; either by time and frequency synchronization on a priori known sequences in the signal if such exist, and application of any method of estimating $g_{int}$ known to those skilled in the art, for example (in a nonlimiting manner) the minimization of the preceding criterion $\hat{\epsilon}_{int}'(l_0, L)$, working wholly or a part the known portion of the signal $s_{int}$ originating from the emitter; or by time and frequency synchronization on a priori known sequences in the signal if such exist, then demodulation/equalization of the whole interfering signal $s_{int}$ and application of any method of estimating $g_{int}$ that is known to those skilled in the art, for example (in a nonlimiting manner) the minimization of the preceding criterion $\hat{\epsilon}_{int}'(l_0, L)$, by using part of the restored interfering signal $s_{int}$; or finally by blind symbol synchronization techniques, carrier recovery/demodulation/equalization relating to the received signal x and using the a priori available on the signal originating from the interfering source $s_{int}$, to restore it, then apply any method of estimating $g_{int}$ known to those skilled in the art, for example (in a nonlimiting manner) the minimization of the preceding criterion $\hat{\epsilon}_{int}'(l_0, L)$, by using all or part of the restored interfering signal $s_{int}$.

Note that one or other of the preceding steps is applied in principle either to the signal x received on a particular, appropriately chosen antenna, dedicated, for example, to demodulation of the forward signal (this is the nonlimiting example of FIG. 2), or to the signal received on an antenna network, possibly the same as that used to apply the method to the useful signal: in this case, the preceding expression of the criterion $\hat{\epsilon}_{int}'(l_0, L)$ to be minimized remains formally identical by taking account, for $x((l_0+1)T_e)$, $g_{int1}$ and $s_{int}((l_0+1)T_e)$, of the signal vectors of dimension N×1, N being the number of antennas, and by considering a vector norm in space of the N-dimensional complex vectors. In this case, a space-time (no longer just time) estimation of the impulse response of the propagation channel between the interfering source and the sensor is obtained.

From one or other of the preceding steps, the propagation filter $g_{int}$ between the interfering emitter and the receiver is deduced in addition to the signal originating from the interfering source $s_{int}(kT_e)$.

Furthermore, by introducing Doppler assumptions into the replica $s_{int}$ and by using the repetitions and recurrences of the signal $s_{int}$ as a basis, it is possible to precisely estimate the relative drifts of the oscillators, the frequency mixers and the clocks of the sensor.

Step 6B) When the chosen interfering emitter is either fixed, or of known position and kinematic, and more stable than the sensor, the estimated drifts are used in the application of the method that is the subject of the invention to increase the integration times (i.e. increase the parameter K) and consequently improve the sensitivity of the method, its Doppler resolution and its capacity to discriminate low speed reflectors or emitters. Finally, the repetition of this extension of the method to several interfering emitters makes it possible to further refine the estimates before the correction of the signals described hereinbelow.

Step 6C) The useful signal, a component of the total signal on the antenna network, is then prefiltered by convoluting the signal from the interfering emitter $s_{int}$ by the preceding estimation of the emitter-receiver propagation filter $g_{int}$, then by subtracting the contribution resulting from this operation from the total signal received on the antenna. In this way, most of the energy contributions resulting from the interfering emitter (forward path+multiple paths) are eliminated by (temporal) processing, the relative contribution and the signal to interference ratio of the useful signal emanating from the emitter or the reflector is greatly increased in the signal resulting from this prefiltering. The inventive method is then applied to the signal x' resulting from the input signal x on completion of this prefiltering, which therefore promotes the overall sensitivity and overall performance levels.

Step 6D) By estimating and compensating for the clock drifts and the local oscillator drifts in the receiver, the value K of the number of samples that can be used in implementing the method, and therefore the Doppler resolution, the capacity to discriminate low speed reflectors, and the processing gain and the sensitivity of the method are also greatly increased by this extension.

Extension of the Method when the Total Noise is Non-Circular

FIG. 3 represents another exemplary embodiment, when the interferences exhibit a non-circularity property, the steps implemented in the extension of the preceding method exploit this property. Such a receiver can be envisaged regardless of the non-circularity property of the emitted signal. The best case corresponds to the case where the emitted signal is rectilinear, in other words for which its complex envelope $s(kT_e)$ has real values. Such is the case in particular for amplitude modulated (AM, ASK) or 2-state phase modulated (BPSK) emitted signals. In these conditions, it is advantageous to replace the sufficient statistic (8) with the statistic $\hat{C}_{nc}(l, m, K)$, 10 in FIG. 3, defined by $$\hat{C}_{nc}(l,m,K) \triangleq (1/\hat{\pi}_s) \hat{r}_{\tilde{x}_m s}(lT_e)^\dagger \hat{R}_{\tilde{x}_m}(lT_e)^{-1} \hat{r}_{\tilde{x}_m s}(lT_e) \quad (17)$$

in which $\tilde{x}_m((k+1)T_e) \triangleq [x_m((k+1)T_e)^T, x_m((k+1)T_e)^\dagger]^T$ and in which $\hat{r}_{\tilde{x}_m s}(lT_e)$ and $\hat{R}_{\tilde{x}_m}(lT_e)$, are defined by (5) and (6) in which $x_m((k+1)T_e)$ is replaced by $\tilde{x}_m((k+1)T_e)$, 6 in FIG. 3, the functional diagram of the sufficient statistic (16).

The statistic (17) is extended to emitted signals that become quasi-rectilinear after a derotation preprocessing. Such is the case in particular for π/2-BPSK or OQPSK type emitted signals or even certain continuous phase modulations (CPM), that is to say frequency modulated and with continuous phase, such as, for example, the MSK and GMSK signals. In these conditions, the sufficient statistic (17) must be implemented but by replacing the space vectors $\tilde{x}_m((k+1)T_e)$ with the space-time vectors derotated with L temporal takes:
$\tilde{x}_{dm,st}((k+1)T_e) \triangleq [\tilde{x}_{dm}((k+(L-1)/2)T_e)^T, \ldots, \tilde{x}_{dm}((k-(L-1)/2)T_e)^T]^T$ if L is odd and $\tilde{x}_{dm,st}((k+1)T_e) \triangleq [\tilde{x}_{dm}((k+L/2)T_e)^T, \ldots, \tilde{x}_{dm}((k-L/2)T_e)^T]^T$ if L is even, in which $\tilde{x}_{dm}((k+1)T_e) \triangleq [x_{dm}((k+1)T_e)^T, x_{dm}((k+1)T_e)^\dagger]^T$, $x_{dm}((k+1)T_e) \triangleq x_d((k+1)T_e) \exp[-j2\pi m(k+1)/K]$, $x_d(t) \triangleq j^{-t/T} x(t)$ and T is the symbol time of the emitted signal.

Extension of the Method when the Directing Vector of the Reflector is Known or Assumed Nominal Extension When the propagation takes place in free space, the useful channel vector $h_s$ is expressed $h_s \triangleq e^{j\phi_s} s$ in which $\phi_s$ and s correspond respectively to the phase and the directing vector of the signal emanating from the emitter or the reflector. When a spatial sweep of the space is envisaged, as is the case for the conventional detection structures, it can be considered that the vector s is known when the spatial cell of the emitter or the reflector is scanned. In these conditions, subject to the assumptions A1 to A6 but with the assumption A4 replaced by the assumption A4' of a single unknown phase $\phi_s$, the conventional detection structures prove optimal only for signals emanating from low power emitters or reflectors, and become sub-optimal for signals emanating from high power emitters or reflectors. In these conditions, optimizing the detection performance levels for all the signal levels can prove useful provided that very low FAPs are targeted.

Figure 4:
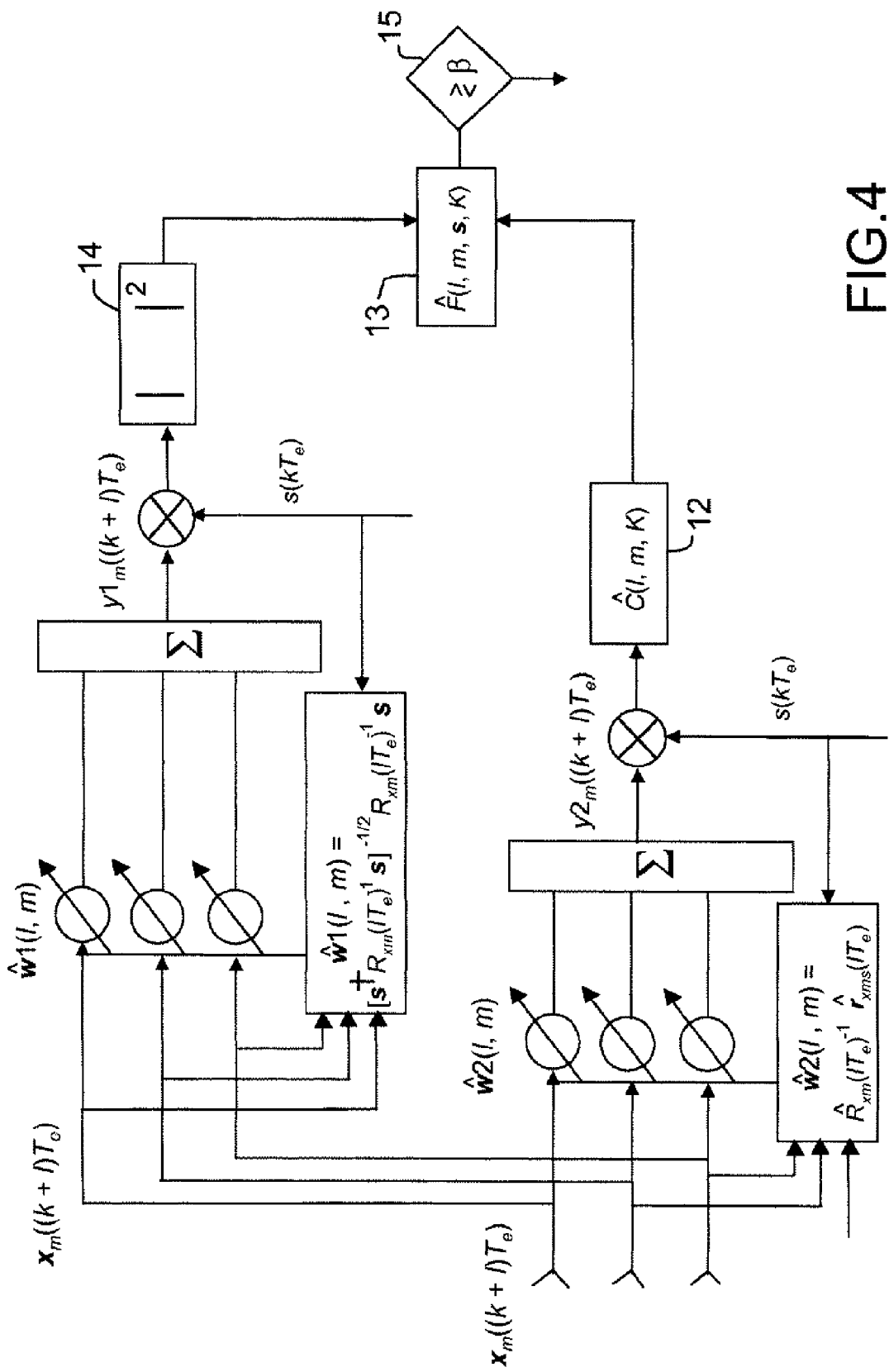

In certain conditions, a sufficient statistic for detection of the known signal $s(kT_e)$ over the duration $0 \leq k \leq K-1$ in the spatial cell s, the distance cell l and the Doppler cell m is given by, as referenced 13, 12, 14 in FIG. 4, $$\hat{F}(l, m, s, K) = (1/\hat{\pi}_s) \frac{\left|s^\dagger \hat{R}_{x_m}(lT_e)^{-1} \hat{r}_{x_m s}(lT_e)\right|^2}{\left(s^\dagger \hat{R}_{x_m}(lT_e)^{-1} s\right)\left(1 - \hat{C}(l, m, K)\right)} \quad (18)$$

in which $\hat{C}(l, m, K)$, 12, is defined by (8). The expression (17) is an extension of (8) when the vector s is known. For low $\mathrm{SINR}_y$ values ($\mathrm{SINR}_y \ll 1$), it is deduced from (16) that $\hat{C}(l, m, K) \ll 1$ and the statistic (17) can be approximated by $$\hat{F}(l, m, s, K) \approx (1/\hat{\pi}_s) \frac{\left|s^\dagger \hat{R}_{x_m}(lT_e)^{-1} \hat{r}_{x_m s}(lT_e)\right|^2}{s^\dagger \hat{R}_{x_m}(lT_e)^{-1} s}, \mathrm{SINR}_y \ll 1 \quad (19)$$

which corresponds to the structure conventionally used in adaptive channel forming, $|s^\dagger \hat{R}_{x_m}(lT_e)^{-1} \hat{r}_{x_m s}(lT_e)|^2$, 14, but normalized by the term $s^\dagger \hat{R}_{x_m}(lT_e)^{-1} s$, which allows for an adjustment of the detection threshold $\beta$, 15, for a given FAP independently of the input noise or interference power. On the other hand, for $\mathrm{SINR}_y$ values that are no longer low, the optimum detector with s known exploits the statistic $\hat{C}(l, m, K)$ explained before, inasmuch as the space filter $\hat{w}(l, m) \triangleq \hat{R}_{x_m}(lT_e)^{-1} \hat{r}_{x_m s}(lT_e)$ in this case converges faster than the filter $\hat{w}_s(l, m) \triangleq \hat{R}_{x_m}(lT_e)^{-1} s$, as is shown in [3]. The functional diagram of the sufficient statistic (17) is shown in FIG. 4.

A total noise only reference is available, and the preceding steps are implemented from an estimate of the total noise only matrix $\hat{R}_{bTm}(lT_e)$, obtained via the noise only reference samples, instead of an estimate of the observations correlation matrix, $\hat{R}_{xm}(lT_e)$.

Non-Circular Extension

When the interferences exhibit a non-circularity property, a receiver capable of exploiting this property can be used, even when s is assumed known. Although implementing such a receiver can be envisaged regardless of the non-circularity property of the emitted signal, the best case also corresponds to the case in which the emitted signal is rectilinear. In these conditions, it is advantageous to replace the sufficient statistic (17) with the statistic $\hat{F}_{nc}(l, m, s, K)$ defined by $$\hat{F}_{nc}(l, m, s, K) = (1/\hat{\pi}_s) \quad (20)$$

$$\frac{\hat{r}_{\tilde{x}_m s}(lT_e)^\dagger \hat{R}_{\tilde{x}_m}(lT_e)^{-1} M \left[M^\dagger \hat{R}_{\tilde{x}_m}(lT_e)^{-1} M\right]^{-1}}{1 - \hat{C}_{nc}(l, m, K)}$$

in which M is the matrix (N×2) defined by $$M \triangleq \begin{pmatrix} s & 0 \\ 0 & s^* \end{pmatrix} \quad (21)$$

The statistic (20) is extended for emitted signals that become quasi-rectilinear after a derotation preprocessing. In these conditions, the sufficient statistic (20) must be implemented but by replacing the space vectors $\tilde{x}_m((k+l)T_e)$ with the space-time vectors derotated with L temporal takes, $\tilde{x}_{dm,st}((k+l)T_e)$, defined in the preceding paragraph.

Non-Circular Extension with Noise Only Reference

For a certain number of applications, a noise plus interference only reference is available through the reception of secondary data devoid of any useful signal. Such is, for example, the case when this secondary data can emanate from distance-Doppler cells neighboring those associated with the presence of a useful signal to be detected. In these conditions, the correlation matrix $\hat{R}_{\tilde{b}Tm}(lT_e)$, of the extended overall noise, $\tilde{b}_{Tm}(lT_e)$, can be estimated from this secondary data by any correlation matrix estimator. From then on, a non-circular detector with total noise only reference can be implemented. Such a detector can correspond either to the receiver (17), if s is unknown, or to the receiver (20), if s is known, but by replacing $\hat{R}_{\tilde{x}_m}(lT_e)$ with $\hat{R}_{\tilde{b}Tm}(lT_e)$ obtained via the noise only reference samples, instead of an estimate of the extended observations correlation matrix, $\hat{R}_{\tilde{x}_m}(lT_e)$, in which $$\tilde{b}_m((k+l)T_e) \triangleq [b_m((k+l)T_e)^T, b_m((k+l)T_E)^\dagger]^T.$$

In the same way, receivers with total noise only reference that use both the primary data (signal plus total noise) and the secondary data, can also be constructed according to the same methodology.

Extension for Wideband Sources

When the received sources (useful signals emanating from the emitter or from the reflector, interferences) are wideband for the antenna network used, which occurs when the ratios $B_e/f_0$ or $\pi D B_e/c$ exceed a few %, in which D is the aperture of the network, $B_e$ the equivalent bandwidth of the signal (considered to be included in the reception band), $f_0$ the carrier of the signal and c the propagation speed, the preceding processing performance levels are degraded, and the following two variant embodiments can be implemented:

the first consists in organizing the reception band into several subbands, narrow for the network, and in implementing the preceding processing operations subband by subband. The benefit of such a strategy is that it organizes relatively simple processing operations in parallel.

the second consists in implementing a reception space-time structure.

In the case where the signal is no longer narrowband for the network of sensors ($\pi DB/c$ exceeds a few %): replacing the preceding space vectors $x_m((k+l)T_e)$ with the space-time vectors with L temporal takes: $x_{m,st}((k+l)T_e) \triangleq [x_m((k+(L-1)/2)T_e)^T, \ldots, x_m((k-(L-1)/2)T_e)^T]^T$ if L is odd and $x_{m,st}((k+l)T_e) \triangleq [x_{dm}((k+L/2)T_e)^T, \ldots, x_{dm}((k-L/2)T_e)^T]^T$ if L is even.

In the case where the signal is also wideband compared to the carrier ($B_e/f_0$ exceeding a few %) and in the case where the kinematic of the emitter or the reflector requires the deformations induced on the replica signal s to be taken into account: introducing into the preceding processing operations not only the delay $lT_e$ and Doppler $m/(KT_e)$ variables, but additional first order variables such as the delay compression and the Doppler compression over the integration time K, second order variables such as the temporal drifts of the preceding variables, etc., writing the signal $s_{l,m}$ corresponding to the transformation of the original signal s by the temporal variables (delay-position, etc.) symbolized by l and the frequency variables (Doppler-kinematic, etc.) symbolized by m, and using the signal $s_{l,m}$ to implement the steps of the method as claimed in the preceding claims and applying the inventive method to this signal $s_{l,m}$.

Such an approach offers the advantage of not introducing any loss in distance resolution.

Complementary Processing Operations

Complementary processing operations can be envisaged using one of the structures described previously. In particular, high resolution goniometry techniques aiming to angularly locate all the emitters of a given distance/Doppler cell can be envisaged either based on the observations $x_m((k+l)T_e)$, $\tilde{x}_m((k+l)T_e)$ or $\tilde{x}_{dm,st}((d+l)T_e)$ associated with this distance/Doppler cell, or based on the results of correlation of the observations with the emitted signal $s(kT_e)$ over intervals that are super-multiples or sub-multiples of K, in other words based on the vectors $\hat{r}_{x_m s}(l \cdot K'T_e)$, K' dividing K or K dividing K', which is the case of reference goniometry.

In the case where s is known, these techniques can be implemented after a spatial filtering of the observations limited to the spatial cell s.

The inventive method is, for example, used with a reception system of known position, and facing emitters or reflectors on which synchronization, position or kinematic information is available on the emission or the reflection of the signals used by the invention, which makes it possible to deduce from the invention absolute temporal information (delay/distance) and absolute frequency information (speed/absolute Doppler) based on the relative information produced by the method that is the subject of the invention.

According to one exemplary implementation, the use of the method is duplicated on several reception systems that are synchronized and communicate with each other, or with an operation center, to produce synchronization, position or kinematic information on the emitters and reflectors in order to obtain absolute temporal and frequency information on the emitters and the reflectors.

The inventive method can be used in one of the following applications: propagation channel measurement (sounding), metrology of radiocommunication and radio broadcasting networks, demodulation and goniometry of communication emitters, active and passive radar, active sonar, friend-foe interrogation, better known by the expression "Identification Friend and Foe (IFF)".

According to a variant embodiment, in the method, the Dopplerized and temporally offset observation vectors $x_m((k+l)T_e)$, $\tilde{x}_m((k+l)T_e)$, $x_{m,st}((k+l)T_e)$ or $\tilde{x}_{dm,st}((k+l)T_e)$ are respectively replaced, for example, by observation vectors that are non-Dopplerized (m=0) and not temporally offset (l=0), $x(kT_e)$, $\tilde{x}(kT_e)$, $x_{st}(kT_e)$ or $\tilde{x}_{d,st}(kT_e)$, and in that the reference signal $s(kT_e)$ is Dopplerized and temporally offset, that is to say replaced by $s_m((k+l)T_e)=s(kT_e)\exp[j2\pi m(k+l)/K]$.

The inventive method can include conventional goniometry steps (high resolution or others) or reference goniometry steps based on delay-distance/Doppler-kinematic or space/delay-distance/Doppler-kinematic assumptions, comprising the implementation of a conventional or high resolution goniometry technique:

either based on the observations $x_m((k+l)T_e)$, $\tilde{x}_m((k+l)T_e)$, $x_{m,st}((k+l)T_e)$ or $\tilde{x}dm,st((k+l)T_e)$ associated with the energy distance/Doppler (l, m), or based on the results of correlation with the emitted signal $s(kT_e)$ of the observations $x_m((k+l)T_e)$, $\tilde{x}_m((k+l)T_e)$, $x_{m,st}((k+l)T_e)$ or $\tilde{x}_{dm,st}((k+l)T_e)$ over intervals that are sub-multiples of K, in the case where the directing vector s is known, after a possible space filtering of the observations limited to the spatial cell s.

The inventive device and method make it possible notably to measure propagation, detect and/or locate a fixed or mobile emitter or reflector in a system comprising N sensors receiving signals from the emitter or the reflector including at least one means making it possible to execute the steps of the method.

According to a variant embodiment, the directing vector of the emitter or the reflector is known and the method includes the following steps Estimating the vector $\hat{r}_{x_m s}(lT_e)$ from the K known samples, $s(kT_e)$, of the signal and the K frequency offset observations, $x_m((k+l)T_e)=x((k+l)T_e)\exp[-j2\pi m(k+l)/K]$, $0 \leq k \leq K-1$, Estimating the matrix $\hat{R}_{x_m}(lT_e)$ from the K frequency offset observations, $x_m((k+l)T_e)=x((k+l)T_e)\exp[-j2\pi m(k+l)/K]$, $0 \leq k \leq K-1$, Calculating the sufficient statistic $\hat{C}(l,m,K) \triangleq (1/\hat{\pi}_s)\hat{r}_{x_m s}(lT_e)^\dagger \hat{R}_{x_m}(lT_e)^{-1}\hat{r}_{x_m s}(lT_e)$ in which $\hat{\pi}_s$ is defined by (9), Calculating the sufficient statistic $$\hat{F}(l, m, s, K) = (1/\hat{\pi}_s)\frac{\left|s^\dagger \hat{R}_{x_m}(lT_e)^{-1}\hat{r}_{x_m s}(lT_e)\right|^2}{\left(s^\dagger \hat{R}_{x_m}(lT_e)^{-1}s\right)(1-\hat{C}(l,m,K))}$$

Setting the detection threshold for a given false alarm probability,

Comparing the value of the statistic $\hat{F}(l, m, s, K)$ with the set detection threshold and, if this threshold value is exceeded, ordering the detection of the reflector in the distance/Doppler cell (l, m) and the spatial cell s, Estimating the relative delay and distance of the emitter or the reflector from l, Estimating the Doppler and the relative speed/kinematic of the emitter or reflector from m, Estimating the angular position of the reflector from s.

REFERENCES

[1] H. L. VAN TREES, "Detection, Estimation and Modulation Theory", Part I, II, III, Wiley and Sons, 1971

[2] J. DARRICAUT, "Physique et Théorie du radar", Volumes 1, 2, 3, Editions Sodipe, 1993,

[3] R. A. MONZINGO, T. W MILLER, "Introduction to adaptive arrays", John Wiley and sons, 1981

[4] W. S. BURDIC, "Underwater Acoustic System Analysis", Prentice Hall Sig. Proc. Series $2^{nd}$ edition, 19991

The invention claimed is:

1. A method for determining one or more parameters of an impulse response of a propagation channel involving emitters, reflectors or sensors that are fixed or mobile, and for detecting and for determining the position and kinematic parameters of the emitters and reflectors, in a system comprising N sensors configured to receive signals from said emitters or reflections from said reflectors, with N being an integer greater than or equal to 2, the method comprising:
- determining an ambiguity function based on coupling of a spatial analysis and a delay-distance/Doppler-kinematic analysis;
- determining at least one sufficient statistic $\hat{C}(l,m,K)$ corresponding to a correlation between a known signal $s(kTe)$ corresponding to a complex envelope of an emitted signal that is subjected to a transformation associated with assumptions regarding the positions and kinematic parameters of the emitters, reflectors and sensors and regarding fluctuations of propagation, and an output of a space filter $w(l,m)$, where l symbolizes a set of temporal assumptions reduced to a delay or a distance and m symbolizes a set of frequency assumptions reduced to a Doppler or a relative speed, wherein:
  - the space filter $w(l,m)$ is input observations $xm((k+1)Te)$, where $0 \leq k \leq K-1$ and Te is a sampling period of the sensor receiving the signals,
  - values of the pair $(l,m)$ are determined by comparing a value of a statistic for the pair $(l,m)$ with a detection threshold value, and
  - m indexes variables $x_m$ and $r_{x_m s}$; and
- for each delay assumption l and each Doppler assumption m:
  - estimating the vector $\hat{r}_{x_m s}(lT_e)$ from K samples $s(kT_e)$ from the emitted signal and from the K samples that are offset in frequencies, where $x_m((k+1)T_e) = x((k+1)T_e)\exp[-j2\pi m(k+1)/K]$, $0 \leq k \leq K-1$;
  - estimating the matrix $\hat{R}_{x_m}(lT_e)$ from the K samples that are offset in frequencies, where $x_m((k+1)T_e) = x((k+1)T_e)\exp$, $0 \leq k \leq K-1$;
  - calculating the sufficient statistic according to $$\hat{C}(l,m,K) \triangleq (1/\hat{\pi}_s) \hat{r}_{x_m s}(lT_e)^\dagger \hat{R}_{x_m}(lT_e)^{-1} \hat{r}_{x_m s}(lT_e), \text{ where } \hat{\pi}_s$$

is defined by a least squares estimate of an average power of the K samples;
  - setting the detection threshold for a predetermined false alarm probability;
  - comparing the sufficient statistic $\hat{C}(l,m,K)$ with the detection threshold and, if the sufficient statistic $\hat{C}(l,m,K)$ exceeds the detection threshold, ordering detection of the emitter or of the reflector in the distance/Doppler pair (l, m);
  - estimating a relative delay and distance of the emitter or of the reflector based on the temporal assumptions symbolized by l;
  - estimating a relative Doppler and speed of the emitter or of the reflector based on the frequency assumptions symbolized by m; and
  - estimating a spatial cell of the emitter or of the reflector from a directing vector $\hat{h}_s$ on an antenna of the emitted signal, the directing vector $\hat{h}_s$ being defined.

2. The method of claim 1, further comprising:
introducing temporal assumptions into the definition of the frequency assumptions, and into the known signal $s(kTe)$ for each assumption l and m, the transformations of the signal being induced by movement of the emitter, the receiver or the reflector, and by fluctuation of the propagation channel, dependent on the delay assumption, the Doppler assumption, a processing integration time, an equivalent bandwidth of the signal, an equivalent duration of the signal, and a periodicity of the signal when the signal is pulsed during a processing integration time period, on fluctuation of the delay over the processing integration time period and on fluctuation of the Doppler over the processing integration time period,
obtaining a signal $s_{l,m}$ based on transformation of the known signal $s(kTe)$ for use according to the temporal assumptions symbolized by l and the frequency assumptions symbolized by m.

3. The method of claim 2, wherein the fluctuation of the delay is a fluctuation modeled to the first order by a temporal ramp.

4. The method of claim 2, wherein the fluctuation of the Doppler is a fluctuation modeled to the first order by a Doppler ramp.

5. The method of claim 1, wherein, a signal of the emitter or the reflector is subject to high interference, a signal $x'_m((k+1)T_e)$ and a replica signal $s'$ replace the input signal $x_m((k+1)T_e$ and the signal s, the signal $x'm((k+1)Te))$ is obtained from the signal $x_m((k+1)T_e)$ and the replica signal $s'$ is obtained from the signal s or from the transformed signal $s_{l,m}$ by enhanced space-time filters, the method further comprising, for each interfering emitter:
estimating an impulse response $g_{int}$ of a propagation filter from the emitter to the receiver by minimizing the criterion $$\hat{\varepsilon}_{int}(l_0, L) \triangleq \frac{1}{L} \cdot \sum_0^{L-1} |x((l_0+l)T_e) - g_{int}^\dagger S_{int}|^2,$$

the replica $S_{int} = (s_{int}((l_0+1)T_e), s_{int}((l_0+l+1)T_e), \ldots, s_{int}((l_0+l+L-1)T_e))^T$ or $S_{int,m,l}'' = (s_{intm,l}^{>>}((l_0+1)T_e), S_{intm,l}^{>>}((l_0+l+1)T_e), \ldots, s_{intm,l}^{>>}((l_0+l+L-1)T_e))^T$ being obtained by total a priori knowledge of an original interfering signal, by partial a priori knowledge of the original interfering signal, or by demodulation/equalization of the original interfering signal, and undergoing a transformation to $S_{int,m,l}$; and
for one or more interfering emitters that are fixed or of known kinematic parameters, introducing different frequency assumptions into the replica $S_{int}$, and exploiting recurrences in the replica $S_{int}$ to estimate, over integration lengths K, frequency and time deviations relative to the interfering emitter, wherein drifts relative to the interfering emitter are estimated for local oscillators of mixers and clocks of the system.

6. The method of claim 5, further comprising:
updating the propagation filter $g_{int}$ associated with the interfering emitter;
for each interfering emitter, executing a convolution of the original $s_{int}$ or transformed $s_{intm,l}$ interfering signal by the updated propagation filter $g_{int}$ associated with the original $s_{int}$ or transformed $s_{intm,l}$ interfering signal,
subtracting the convolution of the original $s_{int}$ or transformed $s_{intm,l}$ interfering signal from a total received signal; and
compensating the frequency and time drifts on:
the signal resulting from $x_m((k+1)T_e)$, to produce signal $x'_m((k+1)T_e)$, whereby the signal s remains unchanged, or
the replica signal $s'$.

7. The method of claim 1, wherein an observation vector $\tilde{x}_m((k+1)T_e) \triangleq [x_m((k+1)T_e)^T, x_m((k+1)T_e)^\dagger]^T$, consisting of an observation vector and a conjugate complex of the observation vector is used to estimate the vector $\hat{r}_{x_m s}(lT_e)$.

8. The method of claim 7, further comprising a total noise only reference, wherein an estimate of an extended total noise only matrix, $\hat{R}_{\tilde{b}_{Tm}}(lT_e)$, is obtained based on noise only reference samples in place of an estimate of an extended observations correlation matrix, $\hat{R}_{\tilde{x}_m}(lT_e)$, where $\tilde{b}_m((k+1)T_e) \triangleq [b_m((k+1)T_e)^T, b_m((k+1)T_e)^\dagger]^T$.

9. The method of claim 1, wherein the emitted signals are quasi-rectilinear following derotation and interferences are not circular, or propagation channels are spread in time, wherein space-time vectors are derotated for the quasi-rectilinear modulations or non-derotated for the rectilinear modulations with L temporal takes $\hat{x}_{dm,st}((k+1)T_e) \triangleq [\tilde{x}_{dm}((k+(L-1)/2)T_e)^T, \ldots, \tilde{x}_{dm}((k-(L-1)/2)T_e)^{TT}$ if L is odd and $\tilde{x}_{dm,st}((k+1)T_e) \triangleq [\tilde{x}_{dm}((k+L/2)T_e)^T, \ldots, \tilde{x}_{dm}((k-L/2)T_e)^{TT}$ if L is even, where $\tilde{x}_{dm}((k+1)T_e) \triangleq {}^T$, $x_{dm}((k+1)T_e) \triangleq x_d((k+1)T_e)$exp, $x_d(t) \triangleq j^{-t/T}x(t)$) and T is the symbol duration.

10. The method of claim 1, wherein a directing vector of the emitter or the reflector is known, the method further comprising:
   estimating the vector $\hat{r}_{x_m s}(lT_e)$ from the K known samples $s(kT_e)$ from the emitted signal and from the K samples that are offset in frequencies, $x_m((k+1)T_e)=x((k+1)T_e)$ exp, $0 \le k \le K-1$,
   estimating the matrix $\hat{R}_{x_m}(lT_e)$ from the K samples that are offset in frequencies, $x_m((k+1)T_e)=x((k+1)T_e)$ exp, $0 \le k \le K-1$,
   calculating the sufficient statistic
   $$\hat{C}(l,m,K) \triangleq (1/\hat{\pi}_s)\hat{r}_{x_m s}(lT_e)^\dagger \hat{R}_{x_m}(lT_e)^{-1}\hat{r}_{x_m s}(lT_e), \text{ where}$$
   $\hat{\pi}_s$
   is defined by calculating the sufficient statistic
   $$\hat{F}(l, m, s, K) = (1/\hat{\pi}_s)\frac{\left|s^\dagger \hat{R}_{x_m}(lT_e)^{-1}\hat{r}_{x_m s}(lT_e)\right|^2}{\left(s^\dagger \hat{R}_{x_m}(lT_e)^{-1}s\right)\left(1 - \hat{C}(l, m, K)\right)},$$
   setting the detection threshold for a given false alarm probability,
   comparing a value of the statistic $\hat{F}(l, m, s, K)$ with the fixed detection threshold and, if the sufficient statistic $\hat{F}(l, m, s, K)$ exceeds the detection threshold, ordering the detection of the reflector in the distance/Doppler cell (l, m) and the spatial cell s,
   estimating a relative delay and distance of the emitter or of the reflector from l,
   estimating a relative Doppler and speed of the emitter or reflector from m, and
   estimating an angular position of the reflector from s.

11. The method of claim 1, further comprising a total noise only reference, wherein an estimate of a total noise only matrix, $\hat{R}_{bTm}(lT_e)$, is obtained based on noise only reference samples in place of an estimate of the observations correlation matrix, $\hat{R}_{xm}(lT_e)$.

12. The method of claim 1, wherein the directing vector of the reflector is known for rectilinear emitted signals and potentially non-circular interferences, and the method further comprises:
   calculating the sufficient statistic
   $$\hat{C}_{nc}(l,m,K) \triangleq (1/\hat{\pi}_s)\hat{r}_{\tilde{x}_m s}(lT_e)^\dagger \hat{R}_{\tilde{x}_m}(lT_e)^{-1}\hat{r}_{\tilde{x}_m s}(lT_e),$$
   constructing a matrix
   $$M \triangleq \begin{pmatrix} s & 0 \\ 0 & s^* \end{pmatrix},$$
   constructing a statistic
   $$\hat{F}_{nc}(l, m, s, K) = (1/\hat{\pi}_s)$$
   $$\frac{\hat{r}_{\tilde{x}_m s}(lT_e)^\dagger \hat{R}_{\tilde{x}_m}(lT_e)^{-1} M\left[M^\dagger \hat{R}_{\tilde{x}_m}(lT_e)^{-1} M\right]^{-1}}{1 - \hat{C}_{nc}(l, m, K)},$$
   setting the detection threshold for a given false alarm probability,
   comparing the value of the statistic $\hat{F}_{nc}(l, m, s, K)$ with the detection threshold and, if the statistic $\hat{F}_{nc}(l, m, s, K)$ exceeds the detection threshold, detecting the emitter or the reflector in the distance/Doppler cell (l, m) and the spatial cell s,
   estimating a relative delay and distance of the emitter or of the reflector from l,
   estimating a relative Doppler and speed of the emitter or of the reflector from m, and
   estimating an angular position of the emitter or of the reflector from s.

13. The method of claim 1, further comprising a total noise only reference, wherein an estimate of an extended total noise only matrix, $\hat{R}_{\tilde{b}_{Tm}}(lT_e)$, is obtained based on noise only reference samples in place of an estimate of an extended observations correlation matrix, $\hat{R}_{\tilde{x}_m}(lT_e)$, where $\hat{b}_m((k+1)T_e) \triangleq {}^T$.

14. The method of claim 1, wherein the Dopplerized and temporally offset observation vectors $x_m((k+1)T_e)$, $\hat{x}_m((k+1)T_e)$, $x_{m,st}((k+1)T_e)$ or $\tilde{x}_{dm,st}((k+1)T_e)$ are respectively replaced by non-Dopplerized (m=0) and non-temporally offset (l=0) observation vectors $x(kT_e)$, $\tilde{x}(kT_e)$, $x_{st}(kT_e)$ or $\tilde{x}_{d,st}(kT_e)$, and the reference signal $s(kT_e)$ is Dopplerized and temporally offset, such that the reference signal $s(kT_e)$ is replaced by $s_m((k+1)T_e)=s(kT_e)$ exp.

15. The method of claim 1, wherein, as signals are emanating from the emitter, the reflector or interferences are wide band for an antenna array used, if ratios $B_e/f_0$ or $pDB_e/c$ are greater than a few percentage points, where D is an aperture of the antenna array, $B_e$ is an equivalent bandwidth of the signal, $f_0$ is a carrier of the signal, and c is a propagation speed, the method further comprising:
   structuring a reception band as several sub-bands;
   implementing processing operations on one sub-band at a time;
   implementing a reception space-time structure;
   if the signal is not narrow band, replacing the space vectors $x_m((k+1)T_e)$ with space-time vectors with L temporal takes: $x_{m,st}((k+1)T_e) \triangleq {}^T$ if L is odd and $x_{m,st}((k+1)T_e) \triangleq {}^T$ if L is even;
   if the signal is wide band compared to the carrier and the kinematic parameters of the emitter or of the reflector require deformations induced on a replica signal s:
      introducing delay, Doppler, and additional variables,
      ordering delay compression and the Doppler compression over the integration time K,
      ordering temporal derivatives, and writing signal $s_{l,m}$ corresponding to transformation of the original signal s by the temporal variables symbolized by l and the frequency variables symbolized by m.

16. The method of claim 1, further comprising implementing a goniometry technique from:
   the observations $x_m((k+1)T_e)$, $\hat{x}_m((k+1)T_e)$, $x_{m,st}((k+1)T_e)$ or $\tilde{x}_{dm,st}((k+1)T_e)$ associated with the energy distance/Doppler (l, m), or
   the results of correlation with the emitted signal $s(kT_e)$ of the observations $x_m((k+1)T_e)$, $\hat{x}_m((k+1)T_e)$, $x_{m,st}((k+1)T_e)$ or $\tilde{x}_{dm,st}((k+1)T_e)$ over intervals that are submultiples of K.

17. A device configured to measure propagation, and detect or locate an emitter or reflector that is fixed or mobile in a system comprising N sensors receiving signals from the emitter or the reflector, wherein the device comprises:
   means for determining an ambiguity function based on coupling of a spatial analysis and a delay-distance/Doppler-kinematic analysis; and
   means for determining at least one sufficient statistic $\hat{C}(l, m, K)$ corresponding to a correlation between a known signal s(kTe) corresponding to a complex envelope of an emitted signal that is subjected to a transformation associated with assumptions regarding the positions and kinematic parameters of the emitters, reflectors and sensors and regarding fluctuations of propagation, and an output of a space filter w(l,m), where l symbolizes a set of temporal assumptions and m symbolizes a set of frequency assumptions, wherein:
      the space filter w(l,m) is input observations xm((k+1)Te), where 0≤k≤K−1 and Te is a sampling period of the sensor receiving the signals,
      values of the pair (l,m) are determined by comparing a value of a statistic for the pair (l,m) with a detection threshold value, and
      m indexes variables $x_m$ and $r_{x_m,s}$; and
   for each delay assumption l and each Doppler assumption m:
      means for estimating the vector $\hat{r}_{x_m s}(lT_e)$ from K samples $s(kT_e)$ from the emitted signal and from the K samples that are offset in frequencies, where $x_m((k+1)T_e)=x((k+1)T_e)\exp[-j2\pi m(k+1)/K]$, 0≤k≤K−1;
      means for estimating the matrix $\hat{R}_{x_m}(lT_e)$ from the K samples that are offset in frequencies, where $x_m((k+1)T_e)=x((k+1)T_e)\exp$, 0≤k≤K−1;
      means for calculating the sufficient statistic according to $$\hat{C}(l,m,K) \triangleq (1/\hat{\pi}_s)\hat{r}_{x_m s}(lT_e)^\dagger \hat{R}_{x_m}(lT_e)^{-1}\hat{r}_{x_m s}(lT_e), \text{ where } \hat{\pi}_s$$

is defined by a least squares estimate of an average power of the K samples;
      means for setting the detection threshold for a predetermined false alarm probability;
      means for comparing the sufficient statistic $\hat{C}(l,m,K)$ with the detection threshold and, if the sufficient statistic $\hat{C}(l,m,K)$ exceeds the detection threshold, ordering detection of the emitter or of the reflector in the distance/Doppler pair (l, m);
      means for estimating a relative delay and distance of the emitter or of the reflector based on the temporal assumptions symbolized by l;
      means for estimating a relative Doppler and speed of the emitter or of the reflector based on the frequency assumptions symbolized by m; and
      means for estimating a spatial cell of the emitter or of the reflector from a directing vector $\hat{h}_s$ on an antenna of the emitted signal, the directing vector $\hat{h}_s$ being defined.

* * * * *